(12) United States Patent
Kim

(10) Patent No.: US 12,028,785 B2
(45) Date of Patent: Jul. 2, 2024

(54) BILLING METHOD AND APPARATUS IN WIRELESS COMMUNICATION SYSTEM

(71) Applicant: Samsung Electronics Co., Ltd., Suwon-si (KR)

(72) Inventor: Bokkeun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 563 days.

(21) Appl. No.: 17/250,638

(22) PCT Filed: Aug. 19, 2019

(86) PCT No.: PCT/KR2019/010478
§ 371 (c)(1),
(2) Date: Feb. 15, 2021

(87) PCT Pub. No.: WO2020/036470
PCT Pub. Date: Feb. 20, 2020

(65) Prior Publication Data
US 2021/0306817 A1    Sep. 30, 2021

(30) Foreign Application Priority Data
Aug. 17, 2018 (KR) ........................ 10-2018-0096224

(51) Int. Cl.
*H04W 4/24* (2024.01)
*H04L 1/08* (2006.01)
*H04L 1/14* (2006.01)
*H04L 12/14* (2006.01)
*H04M 15/00* (2006.01)

(52) U.S. Cl.
CPC ................. *H04W 4/24* (2013.01); *H04L 1/08* (2013.01); *H04L 1/14* (2013.01); *H04L 12/1403* (2013.01); *H04L 12/1425* (2013.01); *H04L 12/1442* (2013.01); *H04M 15/855* (2013.01); *H04M 15/856* (2013.01)

(58) Field of Classification Search
CPC ... H04W 4/24; H04L 1/08; H04L 1/14; H04L 12/1403; H04L 12/1425; H04L 12/1442; H04M 15/855; H04M 15/856
USPC ......................................................... 455/406
See application file for complete search history.

(56) References Cited

U.S. PATENT DOCUMENTS 10,064,034 B2   8/2018   Ahn et al.
10,314,015 B2   6/2019   Shan et al.
(Continued)

FOREIGN PATENT DOCUMENTS

JP    2018-510561 A    4/2018
KR    10-2001-0002984 A    1/2001
(Continued)

OTHER PUBLICATIONS

Communication pursuant to Article 94(3) EPC dated Jan. 26, 2023, in connection with European Application No. 19849412.2, 5 pages.
(Continued)

*Primary Examiner* — Joel Ajayi

(57) ABSTRACT

A method for billing in a wireless communication system, according to an embodiment, includes: transmitting billing data to an upper entity; determining whether the billing data has been normally transmitted; and executing a supplementary operation based on a result of the determining.

2 Claims, 9 Drawing Sheets

(56) References Cited

U.S. PATENT DOCUMENTS

| | | | |
|---|---|---|---|
| 10,903,941 B2 | 1/2021 | Sun et al. | |
| 2008/0125082 A1* | 5/2008 | Salo | H04M 15/00 |
| | | | 455/406 |
| 2010/0208596 A1 | 8/2010 | Jin | |
| 2014/0355508 A1* | 12/2014 | Anchan | H04W 4/08 |
| | | | 370/312 |
| 2016/0142554 A1 | 5/2016 | Anand | |
| 2016/0249255 A1 | 8/2016 | Khawer et al. | |

FOREIGN PATENT DOCUMENTS

| | | |
|---|---|---|
| KR | 10-2008-0078430 A | 8/2008 |
| KR | 10-0956363 B1 | 5/2010 |
| KR | 10-0996569 B1 | 11/2010 |
| KR | 10-2013-0004978 A | 1/2013 |
| KR | 101641096 B1 | 7/2016 |
| KR | 101669777 B1 | 10/2016 |
| KR | 10-2017-0099307 A | 8/2017 |
| KR | 10-2018-0003318 A | 1/2018 |
| KR | 10-1862745 B1 | 6/2018 |
| WO | 10-2011-150688 A1 | 12/2011 |
| WO | 2018028391 A1 | 2/2018 |

OTHER PUBLICATIONS

Translation of the Written Opinion of the International Searching Authority in connection with International Application No. PCT/KR2019/010478 dated Nov. 28, 2019, 6 pages.

Supplementary European Search Report in connection with European Patent Application No. 19849412.2 issued May 27, 2021, 13 pages.

Notice of Non-Final Rejection dated Feb. 28, 2022, in connection with Korean Application No. 10-2018-0096224, 11 pages.

Office Action dated Oct. 12, 2022 in connection with India Patent Application No. 202117001316, 6 pages.

Written Decision on Registration dated Sep. 19, 2022 in connection with Korean Patent Application No. 10-2018-0096224, 10 pages.

International Search Report and Written Opinion of the International Searching Authority in connection with International Application No. PCT/KR2019/010478 dated Nov. 28, 2019, 10 pages.

* cited by examiner

BILLING METHOD AND APPARATUS IN WIRELESS COMMUNICATION SYSTEM

CROSS-REFERENCE TO RELATED APPLICATIONS

This application is a 371 National Stage of International Application No. PCT/KR2019/010478, filed Aug. 19, 2019, which claims priority to Korean Patent Application No. 10-2018-0096224, filed Aug. 17, 2018, the disclosures of which are herein incorporated by reference in their entirety.

BACKGROUND

1. Field

The disclosure relates to a wireless communication system, and to a method and apparatus for seamlessly providing a service in a wireless communication system. More particularly, the disclosure relates to a method and apparatus for processing billing in a wireless communication system.

2. Description of Related Art

To meet the increasing demand with respect to wireless data traffic after the commercialization of $4^{th}$ generation (4G) communication systems, efforts to develop an enhanced $5^{th}$ generation (5G) communication system or a pre-5G communication system are continuing. For this reason, a 5G communication system or pre-5G communication system is called a Beyond 4G Network communication system or a post long term evolution (LTE) system. The 5G communication system defined by the $3^{rd}$ generation Partnership Project (3GPP) is called a new radio (NR) system. To achieve a high data transmission rate, the implementation of 5G communication systems in an ultra-high-frequency millimeter wave (mmWave) band (for example, a 60 GHz band) is being considered. To reduce path loss of radio waves and increase a transfer distance of radio waves in an ultra-high-frequency band, in 5G communication systems, technologies for beamforming, massive multiple input multiple output (massive MIMO), full dimensional MIMO (FD-MIMO), array antenna, analog beam-forming, and large-scale antenna are being discussed, and applied to the NR system. Also, to improve the network of the system, various technologies, such as advanced small cell, cloud radio access network (cloud RAN), ultra-dense networks, device to device communication (D2D), wireless backhaul, moving networks, cooperative communication, coordinated multi-points (COMP), and interference cancellation, have been developed for 5G communication systems. In addition, other technologies, such as hybrid frequency shift keying (FSK) and quadrature amplitude (QAM) modulation (FQAM) and sliding window superposition coding (SWSC) based on advanced coding modulation (ACM) and non-orthogonal multiple access (NOMA) and sparse code multiple access (SCMA) based on filter bank multi carrier (FBMC), have been developed for 5G communication systems.

Meanwhile, the Internet is evolving from a human-centered network in which humans generate and consume information to an Internet of Things (IOT) network in which distributed components such as objects transmit, receive, and process information. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet technology (IT) service is provided to collect and analyze data generated by connected objects to create new value for human life. The IoT may be applied to various fields, such as smart homes, smart buildings, smart cities, smart cars/connected cars, smart grids, health care, smart appliances, and advanced medical services, through convergence and combination between existing information technology (IT) and various industries.

Accordingly, various attempts to apply a 5G communication system to an IoT network are being made. For example, technologies, such as sensor networks, M2M communication, and MTC, are implemented by technologies, such as beam forming, MIMO, and array antenna, which are 5G communication technologies. Applying a cloud radio access network (CRAN) as big data processing technology is also an example of the convergence of 5G technology and IoT technology.

With the development of mobile communication systems as described above, various services are being provided. Therefore, a method for effectively providing such services is required.

SUMMARY

The disclosed embodiments provide an apparatus and method capable of effectively providing a service in a mobile communication system.

A method for billing in a wireless communication system, according to an embodiment, includes: transmitting billing data to an upper entity; determining whether the billing data has been normally transmitted; and executing a supplementary operation based on a result of the determining.

The disclosed embodiments provide an apparatus and method capable of effectively providing a service in a mobile communication system.

DETAILED DESCRIPTION

Figure 1:
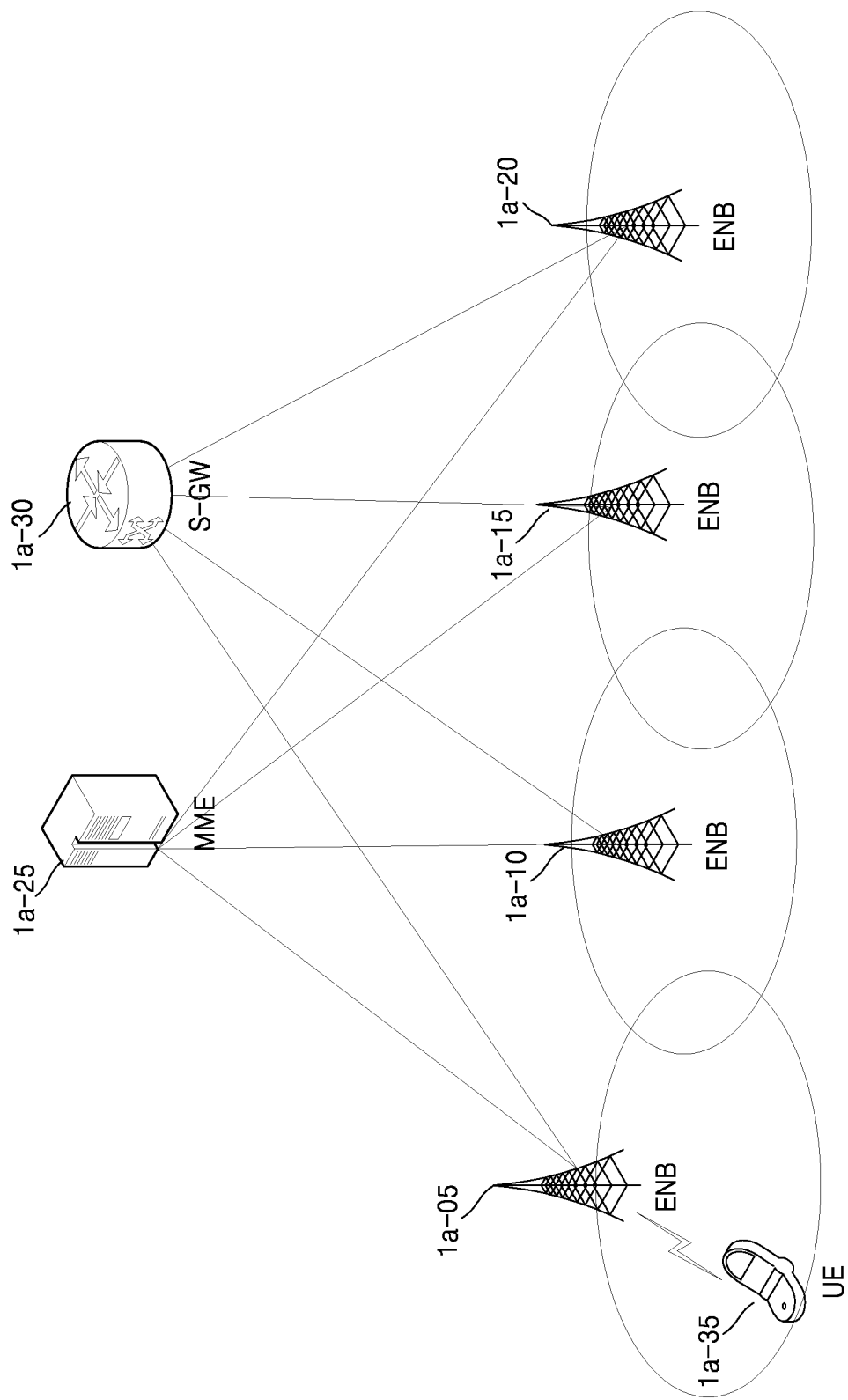
FIG. 1 shows a structure of a long term evolution (LTE) system according to an embodiment.

A method for billing in a wireless communication system, according to an embodiment, includes: transmitting billing data to an upper entity; determining whether the billing data has been normally transmitted; and executing a supplementary operation based on a result of the determining.

Hereinafter, embodiments of the disclosure will be described in detail with reference to the accompanying drawings. When the embodiments are described, descriptions about technical content well known in the technical field to which the disclosure belongs and not directly related to the disclosure will be omitted. The reason for this is to more clearly convey, without obscuring, the gist of the disclosure by omitting unnecessary descriptions.

For the same reason, some components of the accompanying drawings may be exaggeratedly shown, omitted, or schematically shown. Also, the sizes of the components do not completely reflect their actual sizes. The same or corresponding components in the drawings are assigned like reference numerals.

Advantages and features of the disclosure and a method for achieving them will be clear with reference to the accompanying drawings, in which embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure is only defined by the scope of the claims. Like reference numerals denote like components throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer-executable or computer-readable memory capable of directing a computer or other programmable data processing equipment to implement the functions in a particular manner so that the instructions stored in the computer-executable or computer-readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, according to an embodiment of the disclosure, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more Central Processing Units (CPUs) in a device or a security multimedia card. Also, in the embodiments, the 'portion', 'module' or 'unit' may include one or more processors.

In the following descriptions, the terms used to identify connected nodes, the terms indicating network entities, the terms indicating messages, the terms indicating interfaces between network objects, the terms indicating various identification information, etc. are examples for convenience of description. Accordingly, the disclosure is not limited to these terms, and other terms having the equivalent technical meaning may be used.

Hereinafter, for convenience of description, the disclosure uses terms and names defined in a $3^{rd}$ Generation Partnership Project Long Term Evolution (3GPP LTE) standard and/or a $3^{rd}$ Generation Partnership Project New Radio (3GPP NR) standard, or modified terms and names based on the terms and names. However, the disclosure is not limited to the terms and names, and may be applied in the same way to a system based on another standard. Also, in the disclosure, the term User Equipment (UE) may represent various wireless communication devices including mobile phones, NB-IOT devices, and sensors.

FIG. 1 shows a structure of a LTE system according to an embodiment.

Referring to FIG. 1, a radio access network of an LTE system may be configured with Evolved Nodes B (eNBs) (hereinafter, also referred to as Nodes B, LTE nodes, or base stations) 1a-05, 1a-10, 1a-15, and 1a-20, a Mobility Management Entity (MME) 1a-25, and a Serving-Gateway (S-GW) 1a-30. A User Equipment (UE) 1a-35 may be connected to an external network through the ENBs 1a-05, 1a-10, 1a-15, and 1a-20 and the S-GW 1a-30.

In FIG. 1, the eNBs 1a-05, 1a-10, 1a-15, and 1a-20 may correspond to Nodes B of a Universal Mobile Telecommunication System (UMTS). The eNBs 1a-05, 1a-10, 1a-15, and 1a-20 may be connected to the UE 1a-35 through a wireless channel, and perform more complicated functions than the nodes B. In the LTE system, because all user traffics including a real-time service such as Voice over IP (VOIP) are serviced through a shared channel, a device for performing scheduling by collecting status information of UEs, such as buffer statuses of UEs, available transmission power states of UEs, channel states of UEs, etc., is needed. The eNBs 1a-05 to 1a-20 may function as such a device. An eNB may generally control a plurality of cells. For example, to implement a transmission speed of 100 Mbps, the LTE system uses, as air interface technology, Orthogonal Frequency Division Multiplexing (OFDM), for example, in a bandwidth of 20 MHz. Also, Adaptive Modulation & Coding (AMC) of determining a modulation scheme and a channel coding rate according to a channel state of a UE may be applied. The S-GW 1a-30, which is a device for providing data bearers, may generate or remove data bearers according to a control of the MME 1a-25. The MME 1a-25 may be in charge of various control functions, as well as a mobility management function for UEs, and may be connected to a plurality of eNBs.

Figure 2:
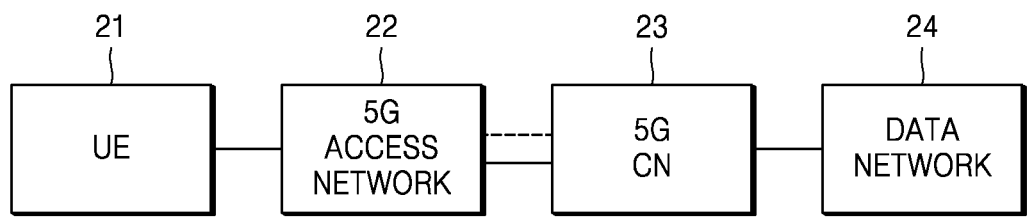
FIG. 2 shows a structure of a next-generation mobile communication system to which an embodiment is applied.

FIG. 2 shows a structure of a next-generation mobile communication system to which an embodiment is applied. Referring to FIG. 2, a next generation mobile communication system (hereinafter, also referred to as a NR or a $5^{th}$ Generation (5G) system) may include a 5G access network 22 and a 5G core network (CN) 23. A UE 21 supporting a next-generation mobile communication system may communicate with a data network 24 through the 5G access network 22 and the 5G core network 23.

The next-generation mobile communication system of FIG. 2 may support a plurality of radio access technologies. According to an embodiment, the next-generation mobile communication system may include a New Radio Node B (hereinafter, also referred to as gNB or NR Node B) supporting a first radio access technology and an eNB supporting the second radio access technology. In this case, both the gNB and eNB may support the UE 21, and the eNB may use a 5G function.

According to an embodiment, the gNB may be used as a secondary node cooperating with the eNB to provide data transmission for the UE 21. That is, the eNB may be used as a master node, and the gNB may be used as a secondary node. In this case, the eNB may configure the gNB, and perform data transmission to the UE 21 based on Dual Connectivity (DC). According to an embodiment, the gNB may be connected to a SGW through a User Plane (UP), without being connected to a MME.

Figure 3:
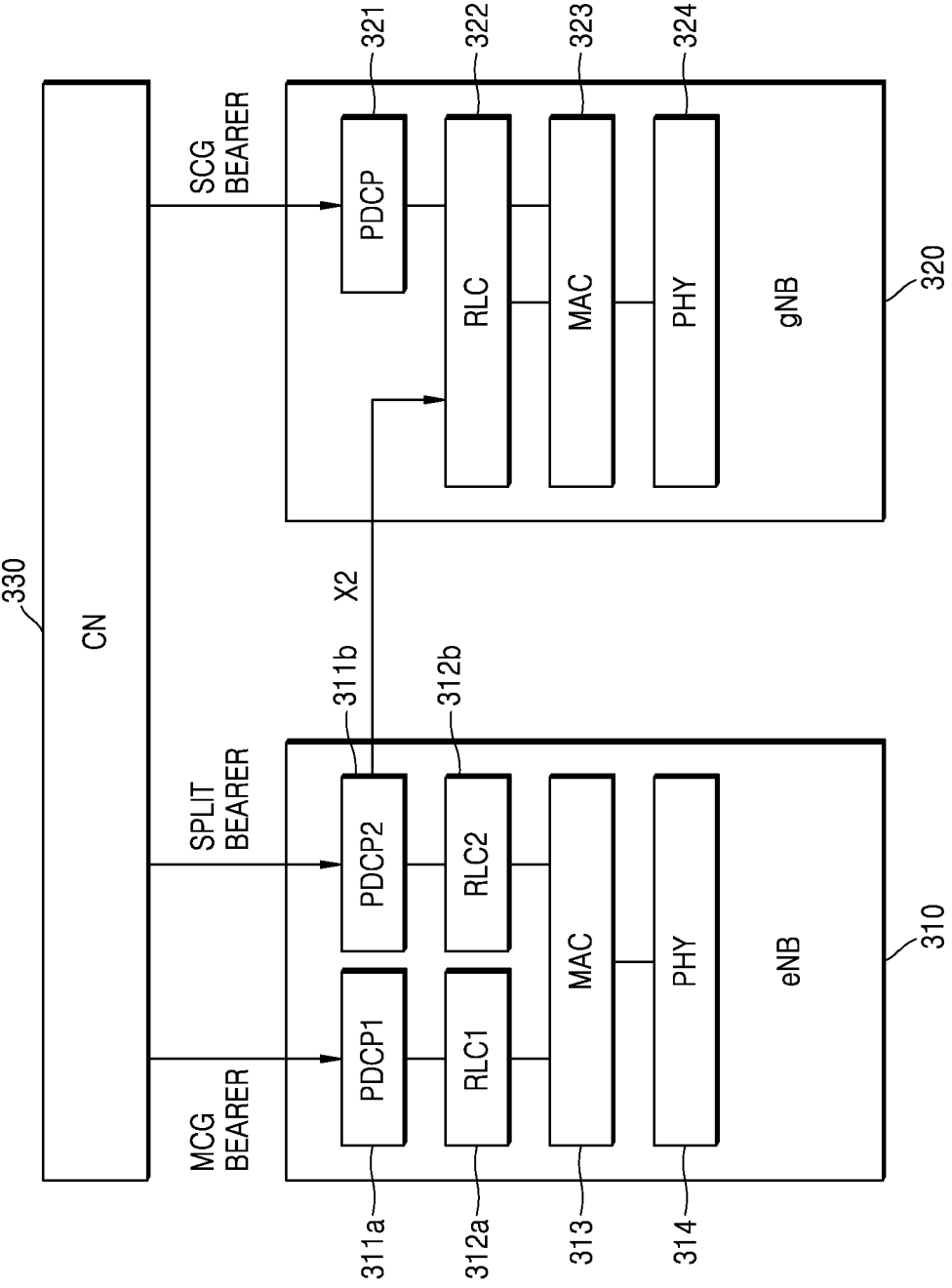
FIG. 3 is a view for describing a protocol structure of a next-generation mobile communication system to which an embodiment is applied.

FIG. 3 is a view for describing a protocol structure of a next-generation mobile communication system to which an embodiment is applied. Referring to FIG. 3, the next-generation mobile communication system may include an eNB 310 and a gNB 320 connected to a core network 330. According to an embodiment, the eNB 310 and the gNB 320 may be connected to the core network 330 through a S1 interface, and the eNB 310 may be connected to the gNB 320 through an X2 interface.

In the next-generation mobile communication system of FIG. 3, various types of bearers may be used for data transmission. According to an embodiment, the bearers may include a split bearer, a Master Cell Group (MCG) bearer, or a Secondary Cell Group (SCG) bearer.

The split bearer may indicate that, when a master node, for example, the eNB 310 receives data from the core network 330, a path for the data is split into two paths and thus the data is transmitted from the master node 310 to a UE via the one path and the data is transmitted from a secondary node, that is, the gNB 320 to the UE via the other path. The MCG bearer may indicate that, when the master node 310 receives data from the core network 330, the data is transmitted from the master node 310 to the UE. The SCG bearer may indicate that, when the secondary node 320 receives data from the core network 330, the data is transmitted from the secondary node 320 to the UE.

Main functions of Packet Data Convergence Protocol (PDCP) 311a, 311b, and 321 may include a part of the following functions.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink Main functions of Radio Link Control (RLC) 312a, 312b, and 322 may include a part of the following functions.
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment Medium Access Control (MAC) 313 and 323 may be connected to several RLC layer devices, and main functions of the MAC 313 and 323 may include a part of the following functions.
  Mapping between logical channels and transport channels
  Multiplexing/demultiplexing of MAC SDUs)
  Scheduling information reporting
  Error correction through HARQ
  Priority handling between logical channels of one UE
  Priority handling between UEs by means of dynamic scheduling
  MBMS service identification
  Transport format selection
  Padding Physical (PHY) layers 314 and 324 may perform an operation of performing channel coding and modulation on upper layer data to generate an OFDM symbol and transmitting the OFDM symbol through a wireless channel, or of performing demodulation and channel decoding on an OFDM symbol received through a wireless channel and transferring a result of the demodulation and channel decoding to an upper layer.

In the next-generation mobile communication system of FIGS. 2 and 3, the UE may perform a procedure of access to a wireless communication system (for example, a LTE system) supporting the second radio access technology through the eNB. At this time, the UE may transmit information about capability supporting the first radio access technology (for example, 5G) to a LTE eNB or a 5G eNB. According to another embodiment, UE information about capability supporting 5G may be transferred through UE subscription information (for example, International Mobile Equipment Identity (IMEI) or Aggregate maximum bitrate (AMBR)).

When the eNB 310 or gNB 320 identifies that the UE is a UE supporting 5G, the eNB 310 or gNB 320 may transmit 5G cell configuration information, 5G cell measurement configuration information, etc. to the UE. According to an embodiment, a 5G eNB and a gateway may set a 5G data bearer via which a 5G service can be provided to the UE. Thereafter, the UE may receive the 5G service from the 5G eNB via the 5G data bearer.

When the UE receives the 5G service, a Control Plane (CP) may be performed by the eNB 310 which is a master node, and in a User Plane (UP) for user packet transmission, an IP address of the gNB 320 which is a secondary node may be used. In this case, because a LTE core network, for example, a MME or Gateway (GW) knows only the IP address of the user plane, the LTE core network cannot identify a radio access technology of a specific user plane. That is, the LTE core network cannot identify which one of an eNB and a gNB the specific user plane is interworking with. Accordingly, in a next-generation mobile communication system based on Dual Connectivity supporting a plurality of radio access technologies, a packet being transmitted through the gNB 320 and a packet being transmitted through the eNB 310 may coexist in the same bearer.

To differentially apply billing for 5G being the first radio access technology and billing for a LTE system being the second radio access technology, the eNB 310 which is a master node may count packets through the gNB 320 to obtain billing data, and transfer the billing date to the GW through a Secondary Radio Access Technology (RAT) Data Usage IE. The GW may differentially apply billing for the 5G and billing for the LTE service based on the received billing data.

Figure 4:
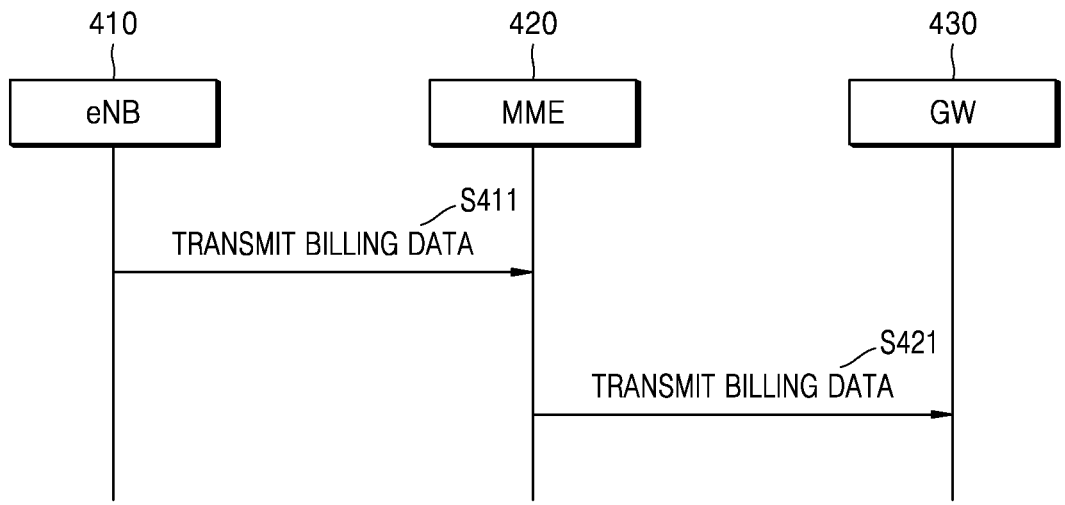
FIG. 4 is a view for describing a billing data transfer method according to an embodiment.

FIG. 4 is a view for describing a billing data transfer method according to an embodiment. Referring to FIG. 4, billing data may be transferred from an eNB 410 to a GW 430 via a MME 420.

In operation S411, billing data obtained by the eNB 410 may be transmitted from the eNB 410 to the MME 420. After the eNB 410 transmits the billing data to the MME 420, the eNB 410 may delete the billing data. The billing data may include RAT information, time/duration information, data volume information, etc. According to an embodiment, the billing data may include information such as [Table 1] and [Table 2] below.

TABLE 1

| IE/Group Name | Presence | Range | IE type and reference | Semantics description | Criticality | Assigned Criticality |
|---|---|---|---|---|---|---|
| Secondary RAT usage report Item | | 1 ... <maxn oofE-RABs> | | | EACH | ignore |
| >E-RAB ID | M | | 9.2.1.2 | | — | — |
| >Secondary RAT Type | M | | ENUMERATED (nR, ***, unlicensed) | | — | — |
| >E-RAB Usage Report List | | 1 | | | — | — |
| >>E-RAB Usage Report Item | | 1 ... <maxn oof time periods> | | | EACH | ignore |
| >>>Start timestamp | M | | OCTET STRING (SIZE(4)) | encoded in the same format as the first four octets of the 64-bit timestamp format as defined in section 6 of IETF RFC 5905 [42]. It indicates the UTC time when the recording of the Secondary RAT Data Volume was started. | | |
| >>>End timestamp | M | | OCTET STRING (SIZE(4)) | encoded in the same format as the first four octets of the 64-bit timestamp format as defined in section 6 of IETF RFC 5905 [42]. It indicates the UTC time when the recording of the Secondary RAT Data Volume was ended. | | |
| >>>Usage count UL | M | | INTEGER $(0 \ldots 2^{64} - 1)$ | The unit is: octets | — | — |
| >>>Usage count DL | M | | INTEGER $(0 \ldots 2^{64} - 1)$ | The unit is: octets | — | — |

TABLE 2

| Range bound | Explanation |
|---|---|
| maxnoofE-RABS | Maximum no. of E-RABs for one UE. Value is 256. |
| maxnoof time periods | Maximum no. of time reporting periods. Value is 2. |

In operation S421, the billing data may be transmitted from the MME 420 to the GW 430. After the MME 420 transmits the billing data to the GW 430, the MME 420 may delete the billing data.

Referring to FIG. 4, because the billing data is transmitted from the eNB 410 to the GW 430 via the MME 420, the GW 430 may differentially apply billing for 5G and billing for a LTE service based on the billing data. Meanwhile, while the billing data is transmitted, the billing data may be lost or an error may occur. Hereinafter, an enhanced billing data transfer method will be described with reference to the accompanying drawing.

Figure 5:
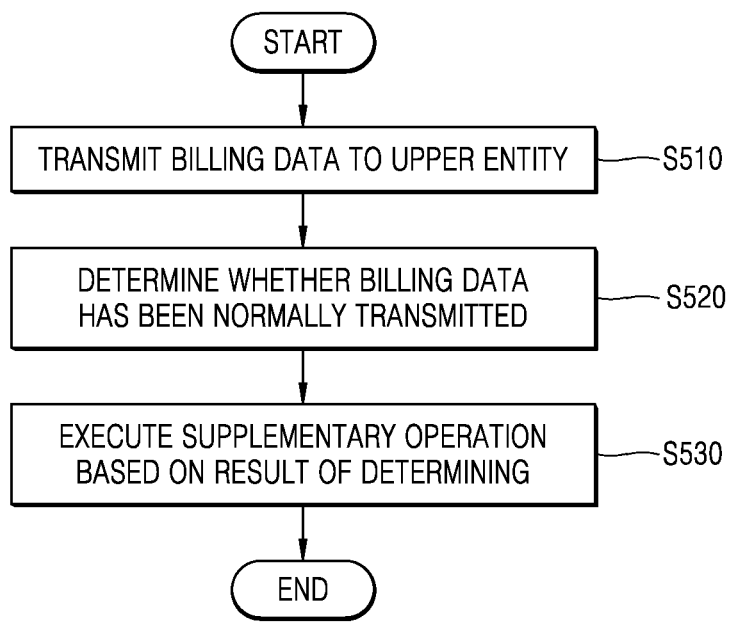
FIG. 5 is a flowchart for describing a billing data transfer method according to an embodiment.

FIG. 5 is a flowchart for describing a billing data transfer method of an entity according to an embodiment.

In operation S510, an entity may transmit billing data to an upper entity. According to an embodiment, the entity may be an eNB or MME. When the entity is an eNB, the billing data may be transmitted to a MME which is an upper entity. When the entity is a MME, the billing data may be transmitted to a GW which is an upper entity.

In operation S520, the entity may determine whether the billing data has been normally transmitted. The billing data may be transmitted through various messages.

According to an embodiment, the billing data may be transmitted through a message for which a response message exists, among messages defined in the 3GPP standard. When a response message exists, the entity may determine whether the upper entity has received the billing data based on information included in the response message, although the upper entity does not transmit any new message.

According to an embodiment, the billing data may be transmitted through a message for which no response message exists, among messages defined or not defined in the 3GPP standard. When no response message exists, the upper entity may transmit a new message representing whether or not the upper entity has received the billing data to the entity.

According to an embodiment, the upper entity may transmit a message representing whether or not billing data has been received to the entity, in unit of each bearer. However, to prevent excessive traffic, the upper entity may obtain and store a billing reception list in unit of each lower entity, not in unit of a bearer. The billing reception list may include information about a plurality of pieces of billing data. The upper entity may transmit a message based on the billing reception list to the entity at regular time intervals.

In operation S530, the entity may perform a supplementary operation based on a result of the determining.

According to an embodiment, the supplementary operation may include an operation of deleting billing data that has been normally transmitted. According to an embodiment, the supplementary operation may include an operation of retransmitting billing data that has not been normally transmitted. Also, according to an embodiment, when there is billing data that has not been completely transmitted during a predefined time interval, the supplementary operation may include an operation of deleting the billing data that has failed to be transmitted, outputting a fault message, and storing the billing data that has failed to be transmitted and identification information of the billing data as a log. However, the supplementary operation according to the disclosure is not limited to the above-described embodiment.

Figure 6:
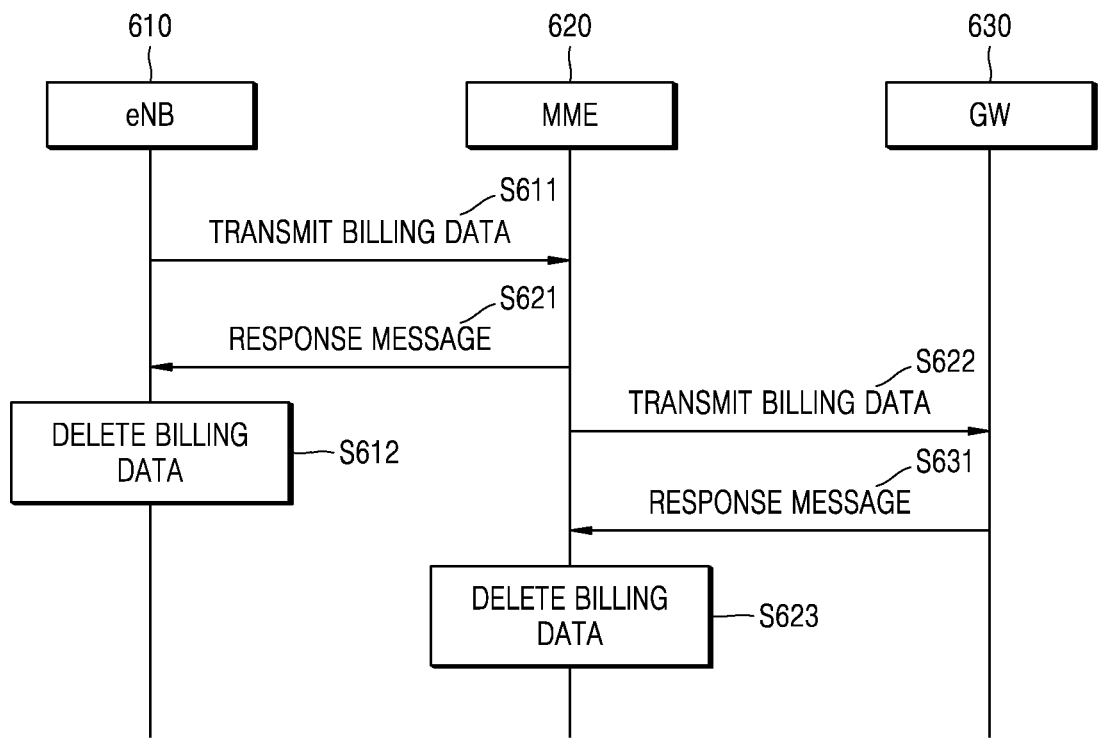
FIG. 6 is a view for describing a billing data transfer method according to an embodiment.

FIG. 6 is a view for describing a billing data transfer method according to an embodiment. Referring to FIG. 6, billing data may be transmitted from an eNB 610 to a GW 630 via a MME 620.

In operation S611, the eNB 610 may transmit the billing data to the MME 620. The billing data may be transmitted through a message for which a response message exists among messages defined in the 3GPP standard. According to an embodiment, the eNB 610 may include the billing data in a message included in [Table 3] below, and transmit the message.

TABLE 3

UE Context Release Request
E-RAB Release Indication
E-RAB Modification Indication In operation S621, when the MME 620 receives the billing data, the MME 620 may transmit a response message including data representing successful reception of the billing data to the eNB 610. The response message may be a response message for the message transmitted from the eNB 610, defined in the 3GPP standard. According to an embodiment, the MME 620 may include the data representing successful reception of the billing data in a response message disclosed in [Table 4] below, and transmit the response message to the eNB 610.

TABLE 4

Release Command Message
E-RAB Release Request
E-RAB Modification Confirm

In operation S612, when the eNB 610 receives the data representing successful reception of the billing data from the MME 620, the eNB 610 may determine that the billing data has been normally transmitted. At this time, the eNB 610 may delete the billing data stored therein.

In operation S622, the MME 620 may transmit the billing data to the GW 630. The billing data may be transmitted through a message for which a response message exists among the messages defined in the 3GPP standard. According to an embodiment, the MME 620 may include the billing data in a message disclosed in [Table 5] below, and transmit the message.

TABLE 5

Release Access Bearer Request
Change Notification
Modify Bearer Request
Modify Access Bearer Request
Create Session Request
Delete Session Request
Delete Bearer Command In operation S631, when the GW 630 receives the billing data, the GW 630 may transmit a response message including data representing successful reception of the billing data to the MME 620. The response message may be a response message for the message transmitted from the MME 620, defined in the 3GPP standard. According to an embodiment, the GW 630 may include data representing successful reception of the billing data in the response message disclosed in [Table 6], and transmit the response message to the MME 620.

TABLE 6

Release Access Bearer Response
Change Notification Ack
Modify Bearer Response
Modify Access Bearer Response
Create Session Response
Delete Session Response
Delete Beare Request In operation S623, when the MME 620 receives the data representing successful reception of the billing data from the GW 630, the MME 620 may determine that the billing data has been normally transmitted. In this case, the MME 620 may delete the billing data stored therein.

Figure 7:
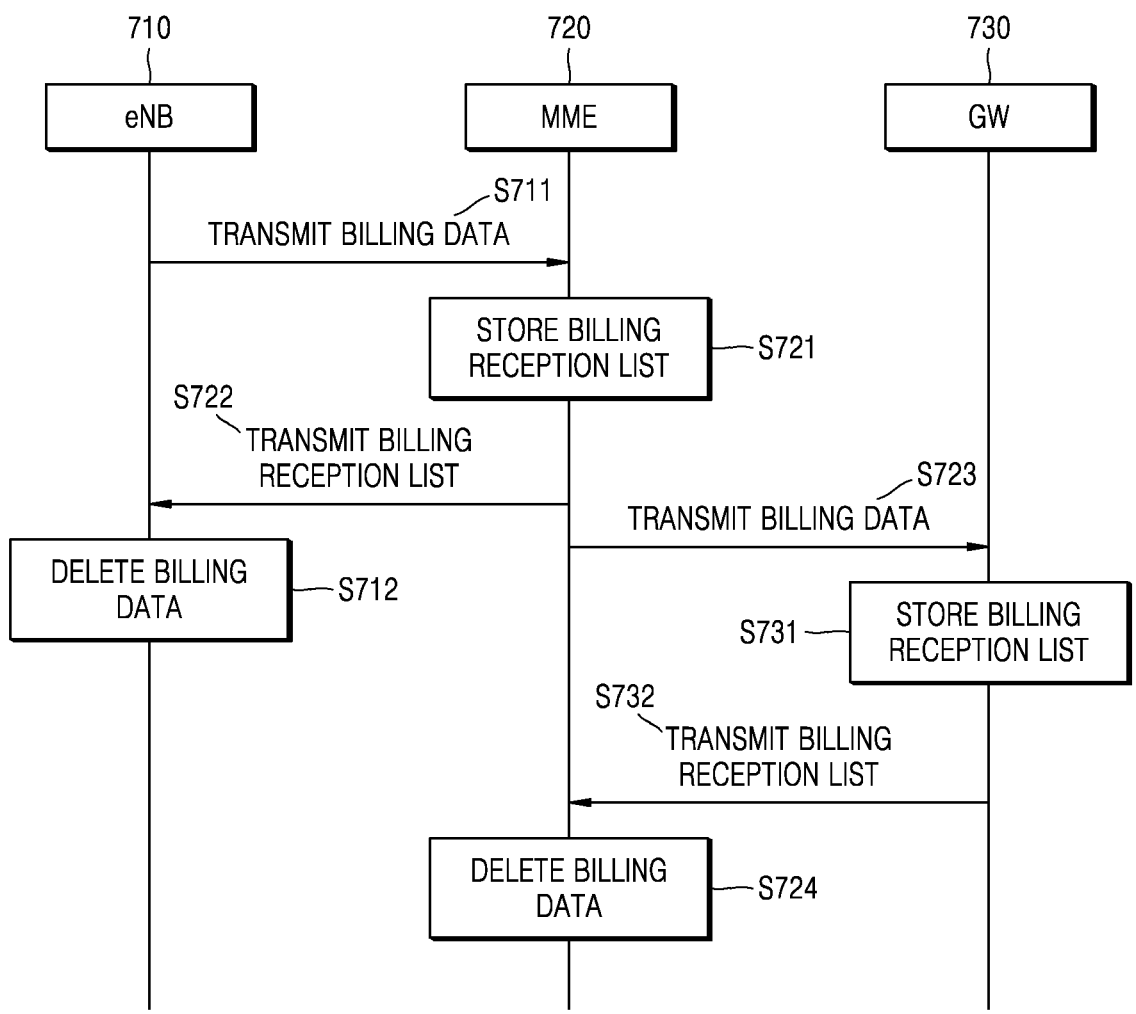
FIG. 7 is a view for describing a billing data transfer method according to an embodiment.

FIG. 7 is a view for describing a billing data transfer method according to an embodiment. Referring to FIG. 7, billing data may be transmitted from an eNB 710 to a GW 730 via a MME 720.

In operation S711, the eNB 710 may transmit the billing data to the MME 720. The billing data may be transmitted through a message for which no response message exists, among messages defined or not defined in the 3GPP standard. According to an embodiment, the eNB 710 may include the billing data in a message disclosed in [Table 7] below, and transmit the message.

TABLE 7

UE Context Release Complete
E-RAB Release Response
Secondary RAT Usage Data Report
ENB Configuration Transfer In operation S721, the MME 720 may obtain and store a billing reception list. The billing reception list may be a list storing billing data received from the eNB 710 and identification information related to the billing data, and may be managed in unit of a lower entity. For example, the MME 720 may receive billing data from a plurality of eNBs, and store billing data for the individual eNBs and identification information related to the billing data as a billing reception list. According to an embodiment, the billing reception list may include International Mobile Subscriber Identity (IMSI) and Evolved Packet System Bearer ID (EBID).

In operation S722, the MME 720 may transmit the billing reception list to the eNB 710.

In the embodiment of FIG. 7, because the eNB 710 has transmitted the billing data to the MME 720 through a message for which no response message exists, the MME 720 may need to transfer the billing reception list to the eNB 710 through a message of a new format. According to an embodiment, the MME 720 may transmit the billing reception list to the eNB 710 by using a MME Configuration Transfer message.

When a predefined event occurs, the MME 720 may transmit the billing reception list to the eNB 710. According to an embodiment, the MME 720 may transmit the billing reception list to the eNB 710 at regular time intervals. A time at which the MME 720 transmits the billing reception list may depend on a communication environment. Alternatively, according to an embodiment, when a predefined amount of information is collected, the MME 720 may transmit the billing reception list to the eNB 710.

Also, according to an embodiment, the MME 720 may transmit a part of the billing reception list to the eNB 710. For example, because the MME 720 can manage a billing reception list in unit of a lower entity, the MME 720 may transmit only a billing reception list corresponding to the eNB 710 among stored billing reception lists to the eNB 710.

In operation S712, the eNB 710 may delete the billing data based on the billing reception list received from the MME 720. More particularly, the eNB 710 may delete billing data identified to have been normally transmitted among the billing data transmitted in operation S711, based on the billing reception list received from the MME 720. That is, the eNB 710 may not delete billing data that does not exist in the billing reception list received from the MME 720, among the billing data transmitted in operation S711.

In operation S723, the MME 720 may transmit the billing data received from the eNB 710 to the GW 730. The billing data may be transmitted through a message for which no response message exists, among the messages defined or not defined in the 3GPP standard. According to an embodiment, the MME 720 may transmit the billing data to the GW 730 through a Delete Bearer Response message.

In operation 731, the GW 730 may obtain and store the billing reception list. The billing reception list may be a list storing billing data received from the MME 720 and identification information related to the billing data, and may be managed in unit of a lower entity. For example, the GW 730 may store billing data for individual MMEs and identification information related to the billing data as a billing reception list. According to an embodiment, the billing reception list may include IMSI and EBID.

In operation S732, the GW 730 may transmit the billing reception list to the MME 720.

The GW 730 may transmit the billing reception list to the MME 720 by using various messages. According to an embodiment, the GW 730 may transmit the billing reception list to the MME 720 by using an Echo Request message. Because the Echo Request message is a message being periodically transmitted from the GW 730 to the MME 720, the GW 730 may transmit the billing reception list to the MME 720 without any additional traffic.

When a predefined event occurs, the GW 730 may transmit the billing reception list to the MME 720. According to an embodiment, the GW 730 may transmit the billing reception list to the MME 720 at regular time intervals. A time at which the GW 730 transmits the billing reception list may depend on a communication environment. Alternatively, according to an embodiment, when a predefined amount of information is collected, the GW 730 may transmit the billing reception list to the MME 720.

Also, according to an embodiment, the GW 730 may transmit a part of the billing reception list to the MME 720. For example, because the GW 730 can manage a billing reception list in unit of a lower entity, the GW 730 may transmit only a billing reception list corresponding to the MME 720 among stored billing reception lists to the MME 720.

In operation S724, the MME 720 may delete the billing data based on the billing reception list received from the GW 730. More particularly, the MME 720 may delete billing data identified to have been normally transmitted among the billing data transmitted in operation S723, based on the billing reception list received from the GW 730. That is, the MME 720 may not delete billing data that does not exist in the billing reception list received from the GW 730, among the billing data transmitted in operation S723.

Figure 8:
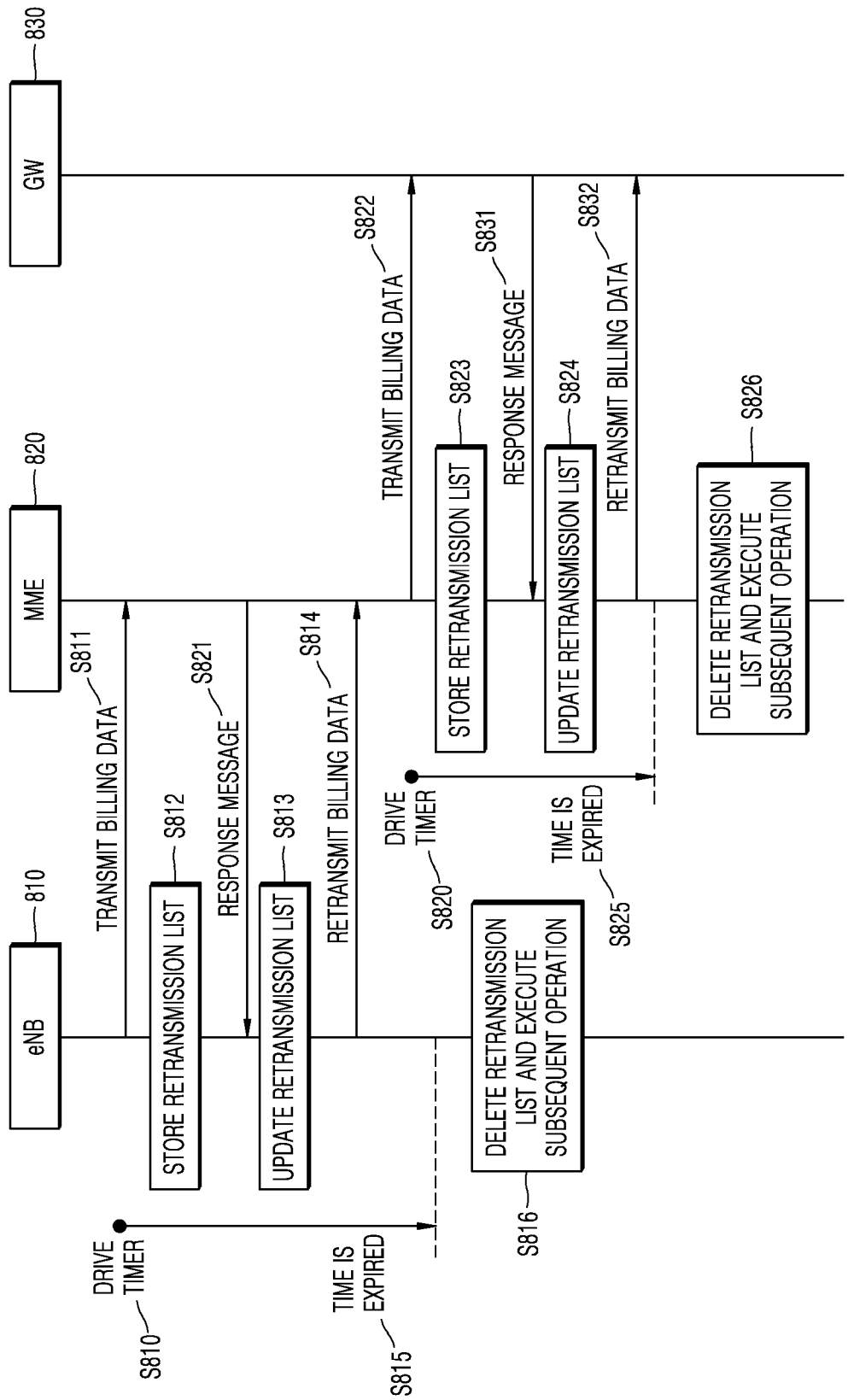
FIG. 8 is a view for describing a billing data transfer method according to an embodiment.

FIG. 8 is a view for describing a billing data transfer method according to an embodiment. According to an embodiment, FIG. 8 describes a billing data transfer method when a data bearer is maintained. According to an embodiment, a procedure in which a bearer is maintained may include a Connection Suspend Procedure, a S1 Release Procedure, an E-RAB Modification Procedure, a Handover Procedure without S-GW Relocation, a procedure of Usage Data Reporting for Secondary RAT, etc.

Referring to FIG. 8, billing data may be transmitted from an eNB 810 to a GW 830 via a MME 820. According to an embodiment, each entity may retransmit billing data when the billing data has failed to be normally transmitted.

In operation S811, the eNB 810 may transmit the billing data to the MME 820. The billing data may be transmitted through messages of various formats.

In operation S810, the eNB 810 may drive a timer. According to an embodiment, the eNB 810 may drive the timer simultaneously when transmitting the billing data in operation S811. Alternatively, the eNB 810 may drive the timer after transmitting the billing data. Start and expiration times of the timer may be set by using various criteria. The timer that is driven by the eNB 810 may be temporal criterion for maintaining a retransmission list which will be described later.

The timer may be driven in various units. According to an embodiment, the timer may be driven for each target UE of billing data. Alternatively, the timer may be driven for each piece of billing data.

In operation S812, the eNB 810 may store a retransmission list. The retransmission list may be a list storing the billing data transmitted from the eNB 810 to the MME 820 in operation S811 and identification information related to the billing data. According to an embodiment, the retransmission list may be managed in unit of a UE or in unit of an upper entity. For example, the eNB 810 may store billing data and identification information related to the billing data for each eNB which is transmitting the billing data, as a retransmission list. According to an embodiment, the retransmission list may include IMSI and EBID.

In operation S821, the MME 820 may transmit a response message to the eNB 810. The response message may represent billing data successfully received by the MME 820 among the billing data transmitted from the eNB 810 to the MME 820 in operation S811.

According to an embodiment, when the eNB 810 transmits the billing data through a message for which a response message exists among the messages defined in the 3GPP standard, the MME 820 may transmit data representing successful reception of the billing data, as a response message, to the eNB 810, by using a response message for the message transmitted from the eNB 810, the response message defined in the 3GPP standard.

According to another embodiment, when the eNB 810 transmits the billing data through a message for which no response message exists, among messages defined or not defined in the 3GPP standard, the MME 820 may transmit data representing successful reception of the billing data as a response message to the eNB 810 through a message of a new format.

According to an embodiment, the MME 820 may obtain and store a billing reception list. The billing reception list may be a list storing billing data received from the eNB 810 and identification information related to the billing data, and may be managed in unit of a lower entity. When the MME 820 receives a plurality of pieces of billing data, the MME 820 may transmit a billing reception list for the plurality of pieces of billing data as a response message, instead of transmitting all response messages for the respective pieces of billing data.

According to an embodiment, when a predefined event occurs, the MME 820 may transmit a response message to the eNB 810. According to an embodiment, the MME 820 may transmit a response message to the eNB 810 at regular time intervals. A time at which the MME 820 transmits the response message may depend on a communication environment. Alternatively, according to an embodiment, when a predefined amount of information is collected, the MME 820 may transmit the response message to the eNB 810.

Also, according to an embodiment, the MME 820 may transmit a part of the billing reception list as a response message to the eNB 810. For example, because the MME 820 can manage a billing reception list in unit of a lower entity, the MME 820 may transmit only a billing reception list corresponding to the eNB 810 among stored billing reception lists to the eNB 810.

In operation S813, the eNB 810 may update the retransmission list based on the response message received from the MME 820. According to an embodiment, the eNB 810 may identify data successfully transmitted to the MME 820 among a plurality of pieces of billing data transmitted in operation S811, based on the response message. The eNB 810 may delete data about the successfully transmitted billing data from the retransmission list, and leave billing data identified to have failed to be transmitted.

In operation S814, the eNB 810 may retransmit the billing data to the MME 820. The eNB 810 may retransmit only the billing data identified to have failed to be transmitted, based on the retransmission list.

When a predefined event occurs, the eNB 810 may perform a retransmission operation. According to an embodiment, the eNB 810 may retransmit the billing data to the MME 820 at regular time intervals. In this case, the eNB 810 may retransmit the billing data by using a message defined to be periodically transmitted, for example, an ENB Configuration message. Alternatively, according to an embodiment, when a predefined amount of information is collected in the retransmission list, the eNB 810 may retransmit the billing data to the MME 820.

In operation S815, the timer driven in operation S810 may be expired.

In operation S816, the eNB 810 may delete the retransmission list based on the expiration of the timer, and execute a subsequent operation.

According to an embodiment, the eNB 810 may delete billing data corresponding to an expired timer and information related to the billing data from the retransmission list, based on a plurality of timers driven. Because continuously retransmitting billing data without limit is inefficient, the eNB 810 may stop retransmitting data that has continuously failed to be retransmitted, by using a timer.

Meanwhile, the eNB 810 may output a fault message for the billing data deleted from the retransmission list based on the expiration of the timer. The eNB 810 may output the fault message to report a user or a network manager that a problem related to billing has occurred. Also, the eNB 810 may store the billing data deleted from the retransmission list based on the expiration of the timer and identification information related to the billing data, as a log. The eNB 810 may provide the information stored as the log in response to a subsequent request.

In operation S822, the MME 820 may transmit the billing data to the GW 830. The billing data may be transmitted through messages of various formats.

In operation S820, the MME 820 may drive a timer. According to an embodiment, the MME 820 may drive the timer simultaneously when transmitting the billing data in operation S822. Alternatively, the MME 820 may drive the timer after transmitting the billing data. Start and expiration times of the timer may be set by using various criteria. The timer that is driven by the MME 820 may be temporal criterion for maintaining a retransmission list stored in the MME 820.

The timer may be driven in various units. According to an embodiment, the timer may be driven for each target UE of billing data. Alternatively, the timer may be driven for each billing data.

In operation S823, the MME 820 may store a retransmission list. The retransmission list may be a list storing billing data transmitted from the MME 820 to the GW 830 in operation S822 and identification information related to the billing data. According to an embodiment, the retransmission list may be managed in unit of a lower entity or an upper entity. According to an embodiment, the retransmission list may include IMSI and EBID.

In operation S831, the GW 830 may transmit a response message to the MME 820. The response message may represent billing data successfully received by the GW 830 among the billing data transmitted from the MME 820 to the GW 830 in operation S822.

According to an embodiment, when the MME 820 transmits the billing data through a message for which a response message exists among the messages defined in the 3GPP standard, the GW 830 may transmit data representing successful reception of the billing data, as a response message, to the MME 820, by using a response message for the message transmitted from the MME 820, the response message defined in the 3GPP standard.

According to another embodiment, when the MME 820 transmits the billing data through a message for which no response message exists, among messages defined or not defined in the 3GPP standard, the GW 830 may transmit data representing successful reception of the billing data to the MME 820 by, as a response message, defining a message of a new format or using a message determined in advance to be periodically transmitted to the MME 820 among predefined messages.

According to an embodiment, the GW 830 may obtain and store a billing reception list. The billing reception list may be a list storing billing data received from the MME 820 and identification information related to the billing data, and may be managed in unit of a lower entity. When the GW 830 receives a plurality of pieces of billing data, the GW 830 may transmit a billing reception list for the plurality of pieces of billing data as a response message, instead of transmitting all response messages for the respective pieces of billing data.

According to an embodiment, when a predefined event occurs, the GW 830 may transmit a response message to the MME 820. According to an embodiment, the GW 830 may transmit a response message to the MME 820 at regular time intervals. A time at which the GW 830 transmits the response message may depend on a communication environment. Alternatively, according to an embodiment, when a predefined amount of information is collected, the GW 830 may transmit the billing reception list to the MME 820.

Also, according to an embodiment, the GW 830 may transmit a part of the billing reception list, as a response message, to the MME 820. For example, because the GW 830 can manage a billing reception list in unit of a lower entity, the GW 830 may transmit only a billing reception list corresponding to the MME 820 among stored billing reception lists to the MME 820.

In operation S824, the MME 820 may update the retransmission list based on the response message received from the GW 830. According to an embodiment, the MME 820 may identify data successfully transmitted to the GW 830 among a plurality of pieces of billing data transmitted in operation S822, based on the response message. The MME 820 may delete data about the successfully transmitted billing data from the retransmission list, and leave billing data identified to have failed to be transmitted.

In operation S832, the MME 820 may retransmit the billing data to the GW 830. The MME 820 may retransmit only the billing data identified to have failed to be transmitted, based on the retransmission list.

When a predefined event occurs, the MME 820 may perform a retransmission operation. According to an embodiment, the MME 820 may retransmit the billing data to the GW 830 at regular time intervals. In this case, the MME 820 may retransmit the billing data by using a message defined to be periodically transmitted, for example, an Echo Request message. Alternatively, according to an embodiment, when a predefined amount of information is collected in the retransmission list, the MME 820 may retransmit the billing data to the GW 830.

In operation S825, the timer driven in operation S820 may be expired.

In operation S826, the MME 820 may delete the retransmission list based on the expiration of the timer, and execute a subsequent operation.

According to an embodiment, the MME 820 may delete billing data corresponding to an expired timer and information related to the billing data from the retransmission list, based on a plurality of timers driven. Because continuously retransmitting billing data without limit is inefficient, the MME 820 may stop retransmitting data that has continuously failed to be retransmitted, by using a timer.

Meanwhile, the MME 820 may output a fault message for the billing data deleted from the retransmission list based on the expiration of the timer. The MME 820 may output the fault message to report a user or a network manager that a problem related to billing has occurred. Also, the MME 820 may store the billing data deleted from the retransmission list based on the expiration of the timer and identification information related to the billing data, as a log. The MME 820 may provide the information stored as the log in response to a subsequent request.

Figure 9:
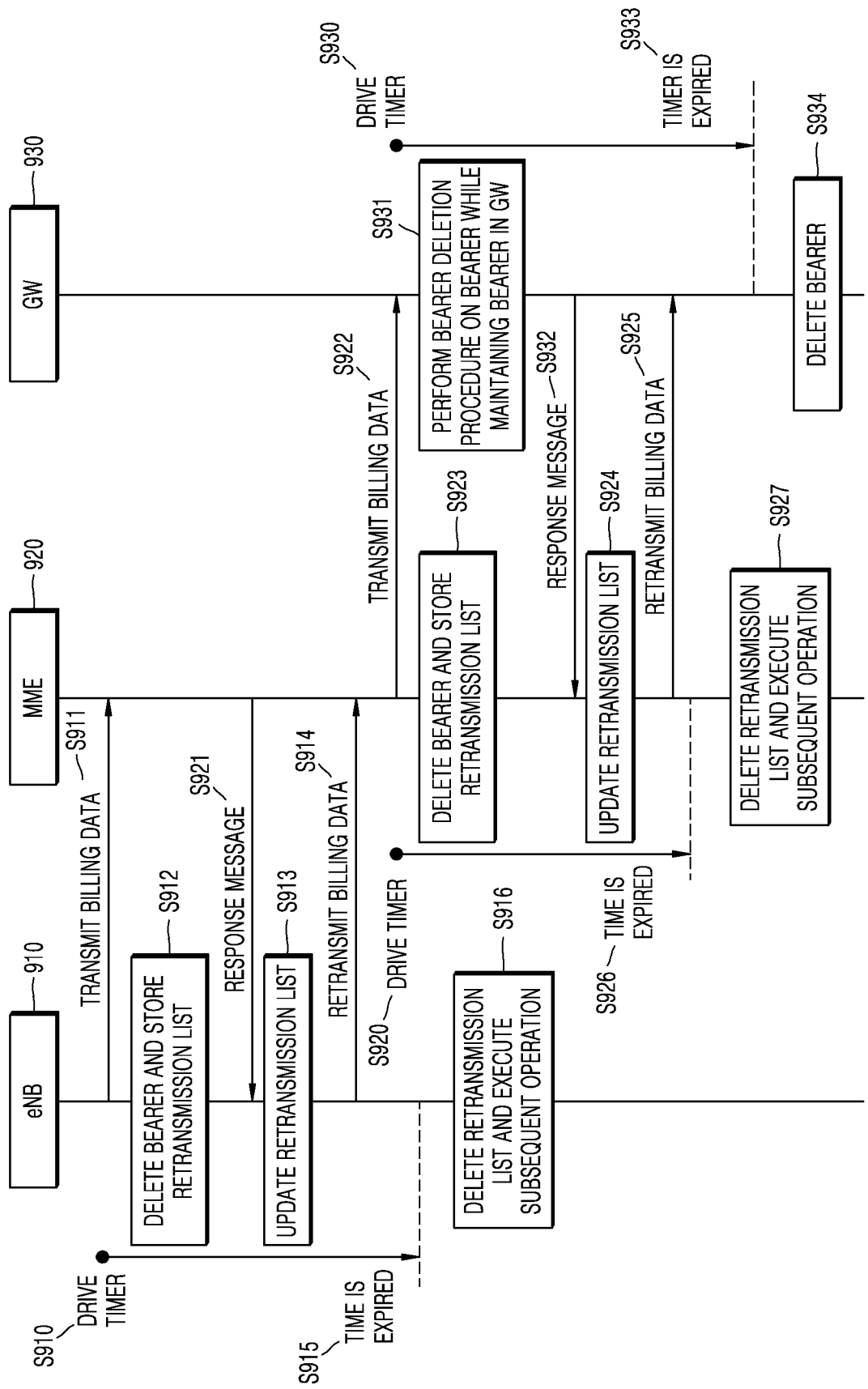
FIG. 9 is a view for describing a billing data transfer method according to an embodiment.

FIG. 9 is a view for describing a billing data transfer method according to an embodiment. FIG. 9 describes a billing data transfer method when a data bearer is deleted. According to an embodiment, a procedure in which a bearer is deleted may include Detach, Bearer Deactivation, PDN Disconnection, Handover Procedure with S-GW Relocation, MME Triggered S-GW Relocation, etc.

Referring to FIG. 9, billing data may be transmitted from an eNB 910 to a GW 930 via a MME 920. According to an embodiment, each entity may retransmit billing data not normally stored, although a bearer is deleted.

In operation S911, the eNB 910 may transmit the billing data to the MME 920. The billing data may be transmitted through messages of various formats.

In operation S910, the eNB 910 may drive a timer. According to an embodiment, the eNB 910 may drive the timer simultaneously when transmitting the billing data in operation S911. Alternatively, the eNB 910 may drive the timer after transmitting the billing data. Start and expiration times of the timer may be set by using various criteria. The timer that is driven by the eNB 910 may be temporal criterion for maintaining a retransmission list. The timer may be driven in various units. According to an embodiment, the timer may be driven for each target UE of billing data. Alternatively, the timer may be driven for each billing data.

In operation S912, the eNB 910 may store a retransmission list. The retransmission list may be a list storing the billing data transmitted from the eNB 910 to the MME 920 in operation S911 and identification information related to the billing data. According to an embodiment, the retransmission list may be managed in unit of a UE or in unit of an upper entity. For example, the eNB 910 may store billing data and identification information related to the billing data, as a retransmission list, for each eNB which is transmitting billing data. According to an embodiment, the retransmission list may include IMSI and EBID.

Meanwhile, when a deletion event for a bearer occurs, the eNB 910 may perform a procedure of deleting the bearer. While the eNB 910 deletes the bearer for which the deletion event has occurred, the eNB 910 may store billing data and identification information for the bearer in the retransmission list to maintain the billing data and identification information.

In operation S921, the MME 920 may transmit a response message to the eNB 910. The response message may represent billing data successfully received by the MME 920 among the billing data transmitted from the eNB 910 to the MME 920 in operation S911. According to an embodiment, the MME 920 may obtain and store a billing reception list. The billing reception list may be a list storing billing data received from the eNB 910 and identification information related to the billing data, and may be managed in unit of a lower entity. When the MME 920 receives a plurality of pieces of billing data, the MME 920 may transmit a billing reception list for the plurality of pieces of billing data as a response message, instead of transmitting all response messages for the respective pieces of billing data.

According to an embodiment, when a predefined event occurs, the MME 920 may transmit a response message to the eNB 910. According to an embodiment, the MME 920 may transmit a response message to the eNB 910 at regular time intervals. A time at which the MME 920 transmits the response message may depend on a communication environment. Alternatively, according to an embodiment, when a predefined amount of information is collected, the MME 920 may transmit the response message to the eNB 910.

Also, according to an embodiment, the MME 920 may transmit a part of the billing reception list as a response message to the eNB 910. For example, because the MME 920 can manage a billing reception list in unit of a lower entity, the MME 920 may transmit only a billing reception list corresponding to the eNB 910 among stored billing reception lists to the eNB 910.

In operation S913, the eNB 910 may update the retransmission list based on the response message received from the MME 920. According to an embodiment, the eNB 910 may identify data successfully transmitted to the MME 920 among a plurality of pieces of billing data transmitted in operation S911, based on the response message. The eNB 910 may delete data about the successfully transmitted billing data from the retransmission list, and leave billing data identified to have failed to be transmitted.

In operation S914, the eNB 910 may retransmit the billing data to the MME 920. The eNB 910 may retransmit only the billing data identified to have failed to be transmitted, based on the retransmission list.

When a predefined event occurs, the eNB 910 may perform a retransmission operation. According to an embodiment, the eNB 910 may retransmit the billing data to the MME 920 at regular time intervals. In this case, the eNB 910 may retransmit the billing data by using a message defined to be periodically transmitted, for example, an ENB Configuration message. Alternatively, according to an embodiment, when a predefined amount of information is collected in the retransmission list, the eNB 910 may retransmit the billing data to the MME 920.

In operation S915, the timer driven in operation S910 may be expired.

In operation S916, the eNB 910 may delete the retransmission list based on the expiration of the timer, and execute a subsequent operation.

According to an embodiment, the eNB 910 may delete billing data corresponding to an expired timer and information related to the billing data from the retransmission list, based on a plurality of timers driven. Because continuously retransmitting billing data without limit is inefficient, the eNB 910 may stop retransmitting data that has continuously failed to be retransmitted, by using a timer.

Meanwhile, the eNB 910 may output a fault message for the billing data deleted from the retransmission list based on the expiration of the timer. The eNB 910 may output the fault message to report a user or a network manager that a problem related to billing has occurred. Also, the eNB 910 may store the billing data deleted from the retransmission list based on the expiration of the timer and identification information related to the billing data, as a log. The eNB 910 may provide the information stored as the log in response to a subsequent request.

In operation S922, the MME 820 may transmit the billing data to the GW 930. The billing data may be transmitted through messages of various formats.

In operation S920, the MME 920 may drive a timer. According to an embodiment, the MME 920 may drive the timer simultaneously when transmitting the billing data in operation S922. Alternatively, the MME 920 may drive the timer after transmitting the billing data. Start and expiration times of the timer may be set by using various criteria. The timer that is driven by the MME 920 may be temporal criterion for maintaining a retransmission list stored in the MME 920.

The timer may be driven in various units. According to an embodiment, the timer may be driven for each target UE of billing data. Alternatively, the timer may be driven for each billing data.

In operation S923, the MME 920 may store a retransmission list. The retransmission list may be a list storing the billing data transmitted from the MME 920 to the GW 930 in operation S922 and identification information related to the billing data. According to an embodiment, the retransmission list may be managed in unit of a lower entity or an upper entity. According to an embodiment, the retransmission list may include IMSI and EBID.

Meanwhile, when a deletion event for a bearer occurs, the MME 920 may perform a procedure of deleting the bearer. While the MME 920 deletes the bearer for which the deletion event has occurred, the MME 920 may store billing data and identification information for the bearer in the retransmission list to maintain the billing data and identification information.

In operation S931, when a deletion event for a bearer occurs, the GW 930 may perform a procedure of deleting the bearer. According to an embodiment, the GW 930 may determine whether a UE connected to the bearer is a UE that can use 5G based on Dual Connectivity (DC), by using Dual Connectivity with NR (DCNR) of a UP Function Selection Indication Flag of a Create Session Request message. When a bearer deletion event for a UE that can use 5G occurs, the GW 930 may execute the following procedure.

In operation S930, the GW 930 may drive a timer. The timer may be temporal criterion based on which the GW 930 maintains the bearer for which the deletion event has occurred. While the GW 930 performs a procedure of deleting the bearer for which the deletion event has occurred, the GW 930 may maintain the bearer therein until the timer is expired.

In operation S932, the GW 930 may transmit a response message to the MME 920. The response message may represent billing data successfully received by the GW 930 among the billing data transmitted from the MME 920 to the GW 930 in operation S922.

According to an embodiment, the GW 930 may obtain and store a billing reception list. The billing reception list may be a list storing billing data received from the MME 920 and identification information related to the billing data, and may be managed in unit of a lower entity. When the GW 930 receives a plurality of pieces of billing data, the MME 820 may transmit a billing reception list for the plurality of pieces of billing data as a response message, instead of transmitting all response messages for the respective pieces of billing data.

According to an embodiment, when a predefined event occurs, the GW 930 may transmit a response message to the MME 920. According to an embodiment, the GW 930 may transmit a response message to the MME 920 at regular time intervals. A time at which the GW 930 transmits the response message may depend on a communication environment. According to an embodiment, when a predefined amount of information is collected, the GW 930 may transmit the response message to the MME 920.

Also, according to an embodiment, the GW 930 may transmit a part of the billing reception list as a response message to the MME 920. For example, because the GW 930 can manage a billing reception list in unit of a lower entity, the GW 930 may transmit only a billing reception list corresponding to the MME 920 among stored billing reception lists to the MME 920.

In operation S924, the MME 920 may update the retransmission list based on the response message received from the GW 930. According to an embodiment, the MME 920 may identify data successfully transmitted to the MME 920 among a plurality of pieces of billing data transmitted in operation S922, based on the response message. The MME 920 may delete data about the successfully transmitted billing data from the retransmission list, and leave billing data identified to have failed to be transmitted.

In operation S925, the MME 920 may retransmit the billing data to the GW 930. The MME 920 may retransmit only the billing data identified to have failed to be transmitted, based on the retransmission list.

When a predefined event occurs, the MME 920 may perform a retransmission operation. According to an embodiment, the MME 920 may retransmit the billing data to the GW 930 at regular time intervals. In this case, the MME 920 may retransmit the billing data by using a message defined to be periodically transmitted, for example, an Echo Request message. Alternatively, according to an embodiment, when a predefined amount of information is collected in the retransmission list, the MME 920 may retransmit the billing data to the GW 930.

In operation S926, the timer driven in operation S920 may be expired.

In operation S927, the MME 920 may delete the retransmission list based on the expiration of the timer, and execute a subsequent operation.

According to an embodiment, the MME 920 may delete billing data corresponding to an expired timer and information related to the billing data from the retransmission list, based on a plurality of timers driven. Because continuously retransmitting billing data without limit is inefficient, the MME 920 may stop retransmitting data that has continuously failed to be retransmitted, by using a timer.

Meanwhile, the MME 920 may output a fault message for the billing data deleted from the retransmission list based on the expiration of the timer. The MME 920 may output the fault message to report a user or a network manager that a problem related to billing has occurred. Also, the MME 920 may store the billing data deleted from the retransmission list based on the expiration of the timer and identification information related to the billing data, as a log. The MME 920 may provide the information stored as the log in response to a subsequent request.

In operation S933, the timer driven by the GW 930 in operation S930 may be expired.

In operation S934, the GW 930 may delete a bearer for which a deletion event occurs. When the bearer is deleted from the GW 930, a billing operation may be not processed even when billing data for the corresponding bearer is received. However, according to an embodiment, when the timer driven by the GW 930 is set to a longer time than a timer driven by a lower entity for maintaining a retransmission list, no billing data for a bearer may be received after the bearer is deleted.

Figure 10:
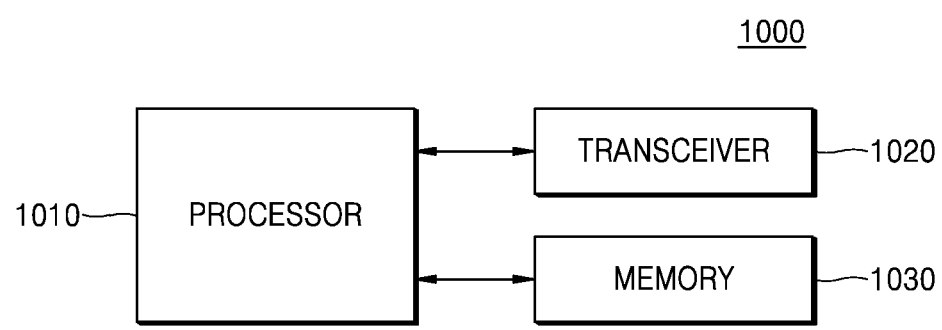
FIG. 10 shows a structure of a base station.

FIG. 10 shows a base station according to an embodiment. Referring to FIG. 10, a base station 1000 may include a processor 1010, a transceiver 1020, and a memory 1030. The base station 1000 may correspond to an eNB 1*a*-05, 1*a*-10, 1*a*-15, or 1*a*-20 illustrated in FIG. 1. The transceiver 1020, the memory 1030, and the processor 1010 of the base station 1000 may operate according to a communication method of the base station 1000 as described above. However, components of the base station 1000 are not limited to the above-mentioned examples. For example, the base station 1000 may be configured with more components than those described above or with less components than those descried above. Also, the transceiver 1020, the memory 1030, and the processor 1010 may be implemented in a form of a chip.

The processor 1010 may control a series of processes such that the base station 1000 operates according to the above-described embodiments of the disclosure. For example, the processor 1010 according to an embodiment of the disclosure may transmit billing data to an upper entity, determine whether the billing data has been normally transmitted, and execute a supplementary operation based on a result of the determining.

The transceiver 1020 may transmit/receive a signal to/from an UE or another entity. The signal may include control information and data. For this, the transceiver 1020 may be configured with an RF transmitter for up-converting and amplifying a frequency of a signal to be transmitted, an RF receiver for low-noise amplifying a received signal and down-converting a frequency of the received signal, etc. However, the RF transmitter and RF receiver are an embodiment of the transceiver 1020, and components of the transceiver 1020 are not limited to the RF transmitter and the RF receiver.

Also, the transceiver 1020 may receive a signal through a wireless channel, output the signal to the processor 1010, and transmit a signal output from the processor 1010 through the wireless channel.

The memory 1030 may store programs and data required for operations of the base station 1000. Also, the memory 1030 may store control information or data included in a signal obtained by the base station 1000. The memory 1030 may be configured with storage media, such as read only memory (ROM), random access memory (RAM), a hard disc, compact disc-read only memory (CD-ROM), and a digital versatile disc (DVD), or a combination of the storage media. Also, the memory 1030 may be configured with a plurality of memories. According to an embodiment, the memory 1030 may store a program for supporting beam-based cooperative communication.

Figure 11:
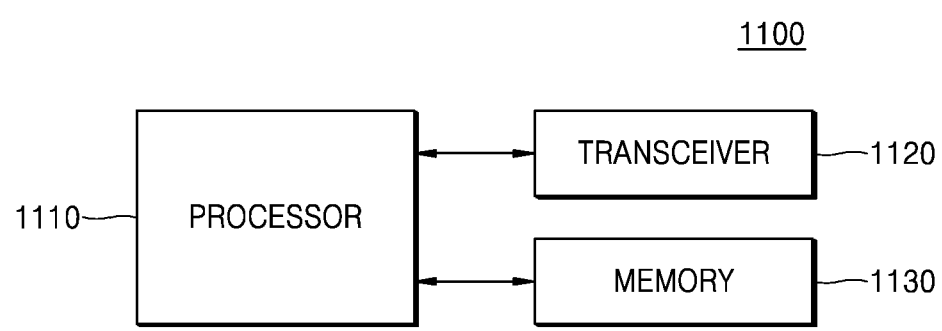
FIG. 11 shows a structure of a gateway according to an embodiment.

FIG. 11 shows an internal structure of a gateway according to an embodiment. Referring to FIG. 11, a gateway 1100 may include a processor 1110, a transceiver 1120, and a memory 1130. However, components of the gateway 1100 are not limited to the above-mentioned examples. For example, the gateway 1100 may be configured with more components than those described above or with less components than those descried above. Also, the transceiver 1120, the memory 1130, and the processor 1110 may be implemented in a form of a chip. Also, the gateway 1100 and other network entities may be integrated into one body.

The processor 1110 may control a series of processes such that the gateway 1100 operates according to the above-described embodiments of the disclosure. According to an embodiment, the processor 1110 may drive a timer based on a deletion event for a bearer, receive billing data of the bearer from a lower entity, and delete the bearer when the timer is expired.

The transceiver 1120 may transmit/receive a signal to/from other entities. The signal may include control information and data. For this, the transceiver 1120 may be configured with an RF transmitter for up-converting and amplifying a frequency of a signal to be transmitted, an RF receiver for low-noise amplifying a received signal and down-converting a frequency of the received signal, etc. However, the RF transmitter and RF receiver are an embodiment of the transceiver 1120, and components of the transceiver 1120 are not limited to the RF transmitter and the RF receiver.

Also, the transceiver 1120 may receive a signal through a wired or wireless channel, output the signal to the processor 1110, and transmit a signal output from the processor 1110 through the wired or wireless channel.

The memory 1130 may store programs and data required for operations of the gateway 1100. Also, the memory 1130 may store control information or data included in a signal obtained by the gateway 1100. The memory 1130 may be configured with storage media, such as ROM, RAM, a hard disc, CD-ROM, and a DVD, or a combination of the storage media. Also, the memory 1130 may be configured with a plurality of memories. According to an embodiment, the memory 1130 may store a program for supporting beam-based cooperative communication.

The methods according to the embodiments of the disclosure described in claims or specification thereof may be implemented in hardware, software, or a combination of hardware and software.

When the methods are implemented in software, a computer-readable storage medium storing at least one program (software module) may be provided. The at least one program stored in the computer-readable storage medium may be configured for execution by at least one processor within an electronic device. The at least one program may include instructions that cause the electronic device to execute the methods according to the embodiments of the disclosure described in the claims or specification thereof.

The program (software module or software) may be stored in RAM, a non-volatile memory including a flash memory, ROM, an electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. Also, a plurality of such memories may be included.

Furthermore, the program may be stored in an attachable storage device that may be accessed through communication networks such as the Internet, Intranet, a local area network (LAN), a wide LAN (WLAN), and a storage area network (SAN) or a communication network configured in a combination thereof. The storage device may access a device performing the embodiments of the disclosure through an external port. Further, a separate storage device on the communication network may also access the device performing the embodiments of the disclosure.

In the embodiments of the disclosure as described above, a component included in the disclosure is expressed in a singular or plural form depending on the described embodiments of the disclosure. However, singular or plural expressions are selected to be suitable for the presented situations for convenience, and the disclosure is not limited to the singular or plural form. A component expressed in a plural form may be configured as a single component, or a component expressed in a singular form may be configured as a plurality of components.

Meanwhile, the embodiments of the disclosure disclosed in the present specification and the drawings are specific examples intended to easily describe the technical content of the disclosure and help understanding the disclosure, not intended to limit the scope of the disclosure. That is, it is apparent to those skilled in the art that other modified examples based on the technical spirit of the disclosure may be executed. Also, the embodiments may be combined and used as needed.

The invention claimed is:

1. A method, performed by an Evolved Node B (eNB) in a wireless communication system, the method comprising:
    transmitting, to a Mobility Management Entity (MME), billing data for a user equipment (UE) connected via dual connectivity (DC) to the eNB as master node and a New Radio Node B (gNB) as secondary node, including radio access technology (RAT) information, to differentially apply billing for 4G service and 5G service;
    driving a timer when transmitting the billing data;
    storing a retransmission list;
    receiving a response message representing reception of the billing data from the MME, and updating the retransmission list based on the response message;
    determining that the billing data has failed to be normally transmitted based on the retransmission list;
    outputting a failure message;
    storing billing data that has failed to be normally transmitted among the billing data, as a log based on the retransmission list; and
    deleting the retransmission list when the timer is expired.

2. An Evolved Node B (eNB) for a wireless communication system, the eNB comprising:
    a memory storing at least one instruction;
    a transceiver; and
    a processor,
    wherein the processor is configured to:
        execute the at least one instruction to transmit, to a Mobility Management Entity (MME), billing data for a user equipment (UE) connected via dual connectivity (DC) to the eNB as master node and a New Radio Node B (gNB) as secondary node, including radio access technology (RAT) information, to differentially apply billing for 4G service and 5G service,
        drive a timer when transmitting the billing data;
        store a retransmission list;

receive a response message representing reception of the billing data from the MME, and updating the retransmission list based on the response message;
determine that the billing data has failed to be normally transmitted based on the retransmission list,
output a failure message;
store billing data that has failed to be normally transmitted among the billing data, as a log based on the retransmission list; and
delete the retransmission list when the timer is expired.

* * * * *